United States Patent
Sakai

(10) Patent No.: US 11,809,995 B2
(45) Date of Patent: Nov. 7, 2023

(54) INFORMATION PROCESSING DEVICE AND METHOD, AND RECORDING MEDIUM FOR DETERMINING A VARIABLE DATA TYPE FOR A NEURAL NETWORK

(71) Applicant: FUJITSU LIMITED, Kawasaki (JP)

(72) Inventor: Yasufumi Sakai, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 598 days.

(21) Appl. No.: 16/997,989

(22) Filed: Aug. 20, 2020

(65) Prior Publication Data

US 2021/0081802 A1  Mar. 18, 2021

(30) Foreign Application Priority Data

Sep. 13, 2019 (JP) ................................. 2019-167656

(51) Int. Cl.
| | |
|---|---|
| G06N 3/08 | (2023.01) |
| G06N 3/084 | (2023.01) |
| G06N 3/063 | (2023.01) |
| G06N 5/046 | (2023.01) |

(52) U.S. Cl.
CPC ............. *G06N 3/084* (2013.01); *G06N 3/063* (2013.01); *G06N 5/046* (2013.01)

(58) Field of Classification Search
None
See application file for complete search history.

(56) References Cited

U.S. PATENT DOCUMENTS

| | | | |
|---|---|---|---|
| 10,229,356 B1* | 3/2019 | Liu | ........................ G10L 15/16 |
| 2009/0232399 A1 | 9/2009 | Kawahara et al. | |
| 2018/0350109 A1* | 12/2018 | Pan | ........................ G06F 18/217 |
| 2019/0244097 A1 | 8/2019 | Notsu et al. | |
| 2020/0302299 A1* | 9/2020 | Nagel | ........................ G06N 3/04 |
| 2021/0034982 A1* | 2/2021 | Sather | ........................ G06N 3/082 |
| 2022/0129759 A1* | 4/2022 | Yao | ........................ G06N 3/084 |

FOREIGN PATENT DOCUMENTS

| | | | |
|---|---|---|---|
| JP | 2001-142867 A | 5/2001 | |
| JP | 2009-217583 A | 9/2009 | |

OTHER PUBLICATIONS

Extended European Search Report dated Feb. 2, 2021 for corresponding European Patent Application No. 20190867.0, 7 pages.

* cited by examiner

*Primary Examiner* — Alan Chen
(74) *Attorney, Agent, or Firm* — Fujitsu Patent Center

(57) ABSTRACT

An information processing device, includes a memory; and a processor coupled to the memory and configured to: calculate a quantization error when a variable to be used in a neural network is quantized, generate a threshold value based on reference information related to a first recognition rate obtained by past learning of the neural network and a second recognition rate that is obtained by calculation of the neural network, determine a variable of data type to be quantized among variables to be used for calculation of the neural network based on the calculated quantization error and the generated threshold value, and execute the calculation of the neural network by using the variable of data type.

10 Claims, 12 Drawing Sheets

FIG. 3

| | |
|---|---|
| <8, 3> | 7 6 5 4 3 2 1 0<br>S \| \| \| \| \| \| \| \|<br>INTEGER PART 4 bits  DECIMAL PART 3 bits |
| <8, 4> | 7 6 5 4 3 2 1 0<br>S \| \| \| \| \| \| \| \|<br>INTEGER PART 3 bits  DECIMAL PART 4 bits |
| <16, 10> | 15 14 13 12 11 10 9 8 7 6 5 4 3 2 1 0<br>INTEGER PART 5 bits  DECIMAL PART 10 bits |
| <16, 12> | 15 14 13 12 11 10 9 8 7 6 5 4 3 2 1 0<br>INTEGER PART 3 bits  DECIMAL PART 12 bits |

INFORMATION PROCESSING DEVICE AND METHOD, AND RECORDING MEDIUM FOR DETERMINING A VARIABLE DATA TYPE FOR A NEURAL NETWORK

CROSS-REFERENCE TO RELATED APPLICATION

This application is based upon and claims the benefit of priority of the prior Japanese Patent Application No. 2019-167656, filed on Sep. 13, 2019, the entire contents of which are incorporated herein by reference.

FIELD

The embodiments discussed herein are related to an information processing device, an information processing method, and a computer-readable recording medium having stored an information processing program.

BACKGROUND

In a pattern recognition device for an image or the like, a technique has been proposed in which a feature vector obtained by extracting a feature of an input pattern is quantized so as to reduce a quantization error, and a pattern is recognized by using the quantized feature vector, thereby reducing a memory amount (for example, see Japanese Laid-open Patent Publication No. 2009-217583).

In a learning-type recognition determination device, there has been proposed a method for improving recognition performance by dividing a quantization range until the number of quantization ranges reaches a predetermined number, changing a network structure to one suitable for an input data distribution, and executing learning (for example, see Japanese Laid-open Patent Publication No. 2001-142867).

For example, Japanese Laid-open Patent Publication No. 2009-217583, 2001-142867, and the like are disclosed.

SUMMARY

According to an aspect of the embodiments, an information processing device, includes a memory; and a processor coupled to the memory and configured to: calculate a quantization error when a variable to be used in a neural network is quantized, generate a threshold value based on reference information related to a first recognition rate obtained by past learning of the neural network and a second recognition rate that is obtained by calculation of the neural network, determine a variable of data type to be quantized among variables to be used for calculation of the neural network based on the calculated quantization error and the generated threshold value, and execute the calculation of the neural network by using the variable of data type.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory diagram illustrating an example of numerical representations by using fixed points;

DESCRIPTION OF EMBODIMENTS

When the calculation of a neural network is performed by using floating-point number data, a memory amount is increased and calculation time is increased as compared with a case where fixed-point number data is used, but calculation accuracy is improved. On the other hand, when the calculation of a neural network is performed by using fixed-point number data, a memory amount is reduced and calculation time is shortened as compared with the case where the floating-point number data is used, but calculation accuracy is lowered.

As a result, for example, when fixed-point number data is used in image recognition or the like by a neural network, a recognition rate may be lowered as compared with a case where floating-point number data is used. As described above, calculation time and a recognition rate of a neural network are in an opposite relationship.

In one aspect, an object of the present embodiments is to reduce calculation time while suppressing a decrease in recognition rate, in a neural network.

Hereinafter, embodiments are described with reference to the drawings.

Figure 1:
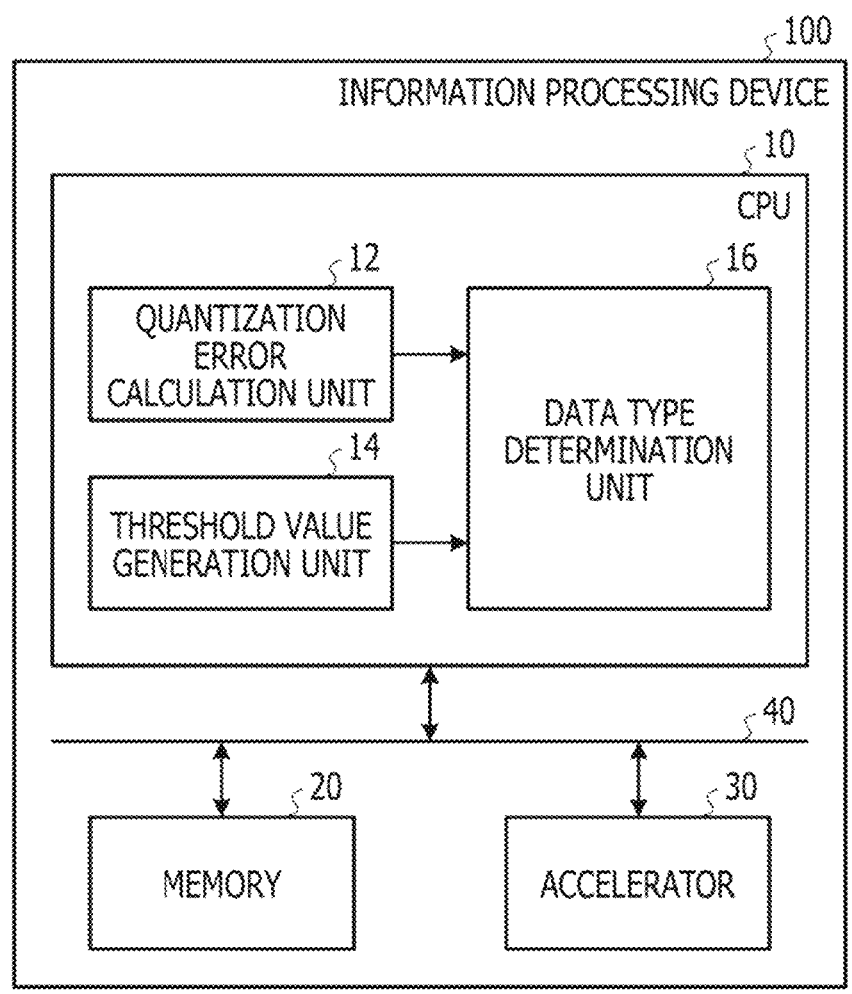
FIG. 1 is a block diagram illustrating an example of an information processing device according to an embodiment.

FIG. 1 illustrates an example of an information processing device according to an embodiment. An information processing device 100 illustrated in FIG. 1 is used for learning or inference such as image processing by using a neural network, for example, or is used for both learning and inference.

The information processing device 100 includes a central processing unit (CPU) 10, a memory 20, and an accelerator 30 that are coupled to one another via a communication bus 40. The information processing device 100 may include another processor, instead of the CPU 10. The information processing device 100 may include elements other than those illustrated, and the information processing device 100 may execute calculation processing to be executed by the accelerator 30 by using the CPU 10 without including the accelerator 30.

The CPU 10 includes a quantization error calculation unit 12, a threshold value generation unit 14, and a data type determination unit 16. The CPU 10 includes an arithmetic unit (not illustrated). In FIG. 1, the CPU 10 executes an information processing program stored in the memory 20 to implement the quantization error calculation unit 12, the threshold value generation unit 14, and the data type determination unit 16.

At least any one of the quantization error calculation unit 12, the threshold value generation unit 14, and the data type determination unit 16 may be implemented by hardware. In this case, the quantization error calculation unit 12, the threshold value generation unit 14, and the data type determination unit 16 may be included not in the CPU 10 but in a field-programmable gate array (FPGA), an application-specific integrated circuit (ASIC), or the like (not illustrated). Functions of the quantization error calculation unit 12, the threshold value generation unit 14, and the data type determination unit 16 will be described later.

The memory 20 stores various programs such as an operating system (OS), an application program, and an information processing program, and data, variables, and the like to be used for processing of the neural network. The memory 20 may store intermediate data generated in the middle of calculation of the neural network and the like. When the quantization error calculation unit 12, the threshold value generation unit 14, and the data type determination unit 16 are implemented by the information processing program executed by the CPU 10, the memory 20 stores the information processing program.

The accelerator 30 is, for example, a graphics processing unit (GPU), a digital signal processor (DSP), or a dedicated processor for deep learning, and is capable of executing calculation of the neural network. The accelerator 30 includes a large number of fixed-point arithmetic units and a large number of floating-point arithmetic units (not illustrated).

Figure 2:
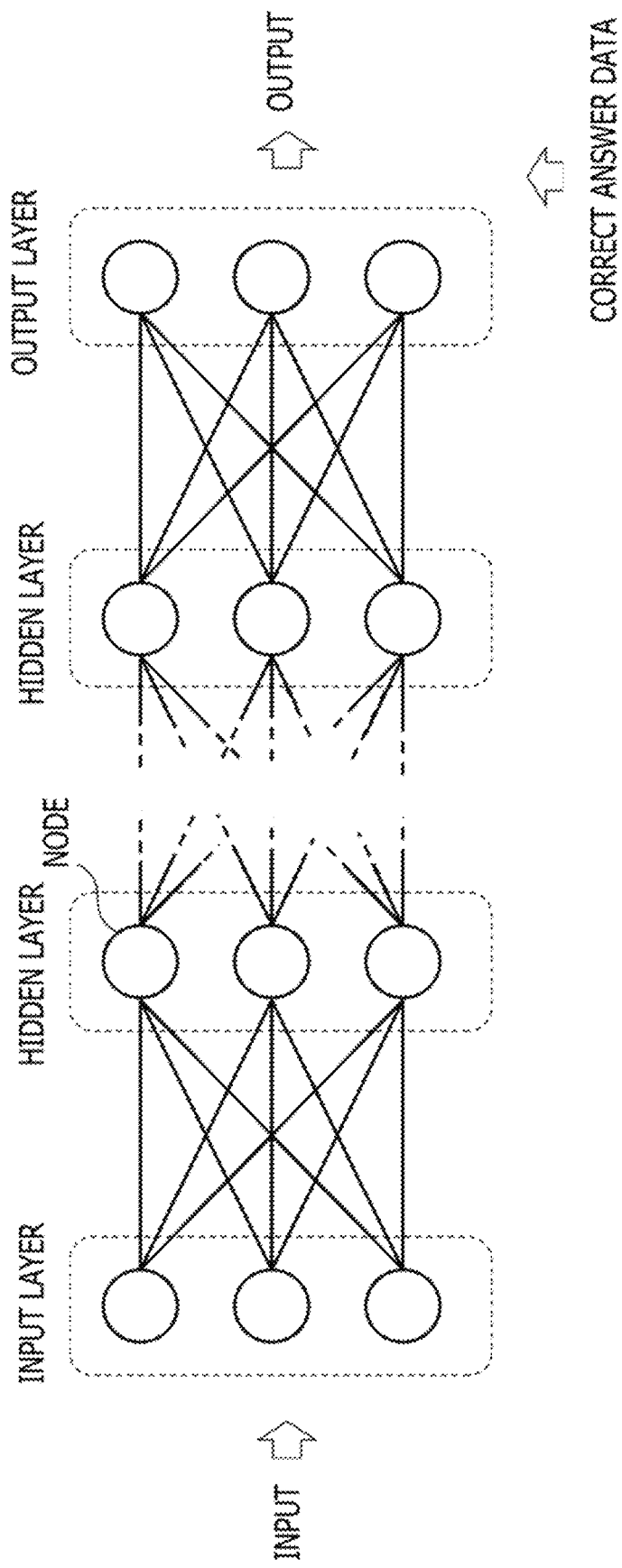
FIG. 2 is an explanatory diagram illustrating an outline of a neural network.

FIG. 2 illustrates an overview of a neural network. The neural network illustrated in FIG. 2 is a deep neural network including a plurality of hidden layers between an input layer and an output layer. Examples of the hidden layer include a convolutional layer, a pooling layer, a fully connected layer, or the like. Circles illustrated in each layer indicate nodes each of which performs a predetermined calculation.

For example, the information processing device 100 inputs each of a plurality of pieces of learning data (input data) included in a mini-batch to the input layer, and sequentially executes calculation of a convolutional layer, a pooling layer, and the like, thereby executing forward propagation processing of sequentially transmitting information obtained by the arithmetic operation from an input side to an output side. The mini-batch is obtained by dividing a data set (batch) to be used for learning into a plurality of pieces, and includes a predetermined number of pieces of input data (image data or the like). For example, in the convolutional layer, activities which are output data (intermediate data) from the previous layer, and weights prepared in advance as learning data are subjected to a convolution operation, and activities which are output data obtained by the arithmetic operation are output as input data of the next layer.

After the execution of the forward propagation processing by using the mini-batch, backward propagation processing is executed to calculate gradients in order to reduce a difference (for example, a square sum of errors) between output data output from the output layer and correct answer data. Update processing of updating variables such as weights is executed based on a result of the backward propagation processing. For example, as an algorithm for determining an update width of the weights to be used for the calculation of the backward propagation processing, a method of gradient descent is used. For example, after the variables are updated, a recognition rate (correct answer rate) is calculated by operating the neural network by using data for determination.

In the following, the weights, activities, and gradients to be used in the calculation of the neural network are also referred to as variables. By executing the forward propagation processing, the backward propagation processing, and the update processing of variables in each of a plurality of mini-batches, the recognition rate gradually increases, and the deep neural network is optimized.

FIG. 3 illustrates an example of numerical representations by using fixed points. In FIG. 3, a sign S indicates a sign bit, and a black circle indicates a decimal point position. As for <a, b> illustrated in the left column in FIG. 3, "a" indicates the number of bits of a fixed-point number, and "b" indicates the number of bits of a decimal part (for example, a decimal point position).

<8, 3> indicates that the fixed-point number has 8 bits, the decimal part is the lower 3 bits, and the integer part is the upper 4 bits except for the sign bit S. <8, 4> indicates that the fixed-point number has 8 bits, the decimal part is the lower 4 bits, and the integer part is the upper 3 bits except for the sign bit S.

<16, 10> indicates that the fixed-point number has 16 bits, the decimal part is the lower 10 bits, and the integer part is the upper 5 bits except for the sign bit S. <16, 12> indicates that the fixed-point number has 16 bits, the decimal part is the lower 12 bits, and the integer part is the upper 3 bits except for the sign bit S.

Figure 4:
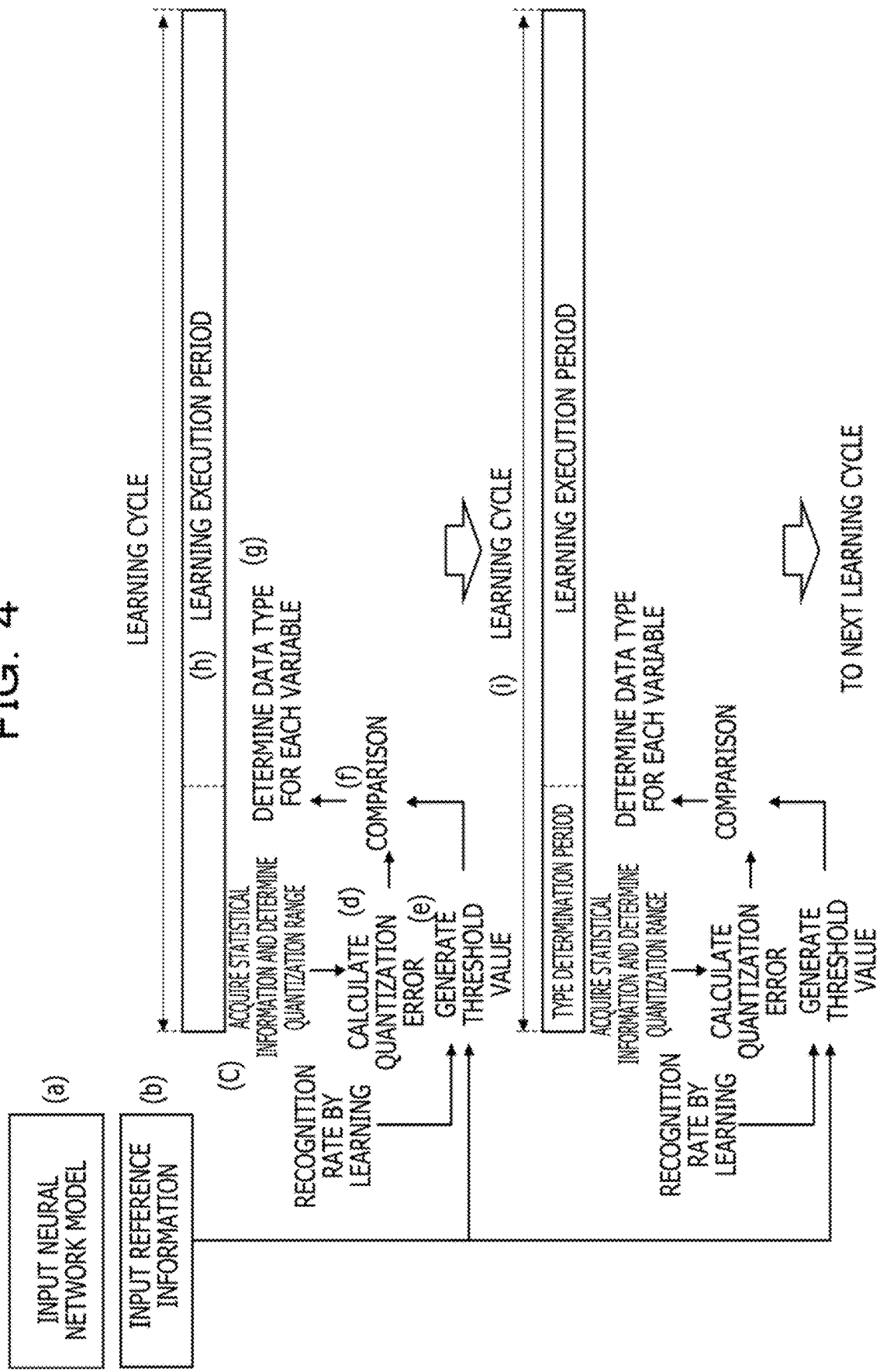
FIG. 4 is an explanatory diagram illustrating an example of learning of a neural network by the information processing device illustrated in FIG. 1.

FIG. 4 illustrates an example of learning of a neural network by the information processing device 100 illustrated in FIG. 1. In the learning illustrated in FIG. 4, a learning cycle including a type determination period that is a learning period for determining data types of variables used for calculation of the neural network, and a learning execution period for executing the learning by using the data types determined in the type determination period is repeated a plurality of times. The data type is either a floating-point number or a fixed-point number. The learning cycle is an example of a calculation cycle in which the calculation of the neural network is executed, and the learning execution period is an example of a calculation execution period in which the calculation of the neural network is executed by using the variables of the data types determined by the data type determination unit 16 after the type determination period.

First, before the first learning cycle is started, a neural network model is input to the information processing device 100 by an operation of a user or the like who causes the information processing device 100 to execute learning of the neural network (in FIG. 4(a)).

Reference information serving as a reference for generating a threshold value to be described later is input to the information processing device 100 by an operation of a user or the like (FIG. 4(b)). For example, the reference information includes information indicating changes in recognition rate in a case where the learning of the neural network has been executed by using variables being floating-point numbers in a period of time (in the past) before a learning cycle is started. Alternatively, the reference information includes information indicating a maximum recognition rate obtained in a case where the learning of the neural network has been executed in a period of time (in the past) before a learning cycle is started. For example, the reference information is information related to the recognition rate obtained by the past learning of the neural network. Note that the reference information may be information indicating changes in recognition rate or information indicating a maximum recognition rate, in learning that has been executed in the past in a neural network similar to the neural network to be learned in FIG. 4.

For example, in the type determination period of the first learning cycle, calculation is executed in each layer of the neural network by using input data of fixed-point numbers each of which has a predetermined number of bits (bit width) and variables such as weights. Activities of fixed-point numbers are generated by the arithmetic operation of the forward propagation processing, gradients of the fixed-point numbers are generated for respective layers by the arithmetic operation of the backward propagation processing, and weights are updated. For example, the calculation in each layer is executed by the accelerator 30 when the CPU 10 in FIG. 1 instructs the accelerator 30.

The quantization error calculation unit 12 in FIG. 1 acquires statistical information of fixed-point number data for each variable (for example, for each variable in each layer) to be used for the calculation of the neural network in the type determination period, and determines a quantization range (the number of bits and a bit position) (FIG. 4(c)). In a case where the number of bits has been determined in advance, the quantization error calculation unit 12 determines only the bit position (the decimal point position illustrated in FIG. 3).

For example, the quantization error calculation unit 12 acquires a distribution of the most significant bit for each variable as the statistical information. The quantization error calculation unit 12 determines the quantization range of the fixed-point number data for each variable by using the acquired statistical information. The statistical information of each variable may be acquired by the execution of an arithmetic operation by the accelerator 30 based on an instruction from the CPU 10.

Next, the quantization error calculation unit 12 calculates, for each layer, a quantization error of fixed-point number data converted so as to be included in the determined quantization range with respect to the original fixed-point number data before quantization (FIG. 4(d)). For example, the quantization error calculation unit 12 integrates a quantization error of individual fixed-point number data for each variable in each layer, and calculates an average value of the integrated quantization errors, thereby obtaining a quantization error for each layer.

For example, when an arithmetic operation is performed by using a fixed-point product-sum arithmetic unit, bit ranges and bit positions (for example, quantization ranges) of an input operand and an output operand are the same as each other. Therefore, the quantization error may be calculated for each layer by using the common quantization range, and a processing amount in the quantization error calculation unit 12 may be reduced. A method of acquiring statistical information, a method of determining a quantization range, and a method of calculating a quantization error will be described with reference to FIG. 5.

The threshold value generation unit 14 in FIG. 1 compares a recognition rate obtained by learning in the type determination period with the recognition rate indicated as the reference information, and generates a threshold value according to the comparison result (FIG. 4(e)). As will be described later, the threshold value is used to determine whether a data type of each variable is a floating-point type or a fixed-point type based on the quantization error calculated by the quantization error calculation unit 12.

For example, in this embodiment, the threshold value generation unit 14 generates one threshold value in common for all the variables. Since the threshold value is generated based on the recognition rate that is the learning result of the entire neural network, the threshold value generation unit 14 may easily generate one threshold value by comparing the recognition rate obtained by learning with the past recognition rate.

When there is a variable of which a distribution of the quantization error deviates by a predetermined amount or more, a plurality of threshold values may be generated according to the respective distributions of the quantization errors. For example, when the distributions of the quantization errors are different from each other for respective types of variables, the threshold value generation unit 14 may generate a threshold value for each of the types of variables. In this case, the optimum threshold value may be generated for each of the types of variables according to the degree of deviation of the distribution of the quantization error and according to the quantization error. As a result, a recognition rate in the subsequent learning may be made to easily approach the recognition rate in the past learning in which the floating-point number data has been used.

The data type determination unit 16 in FIG. 1 compares, for each layer, a magnitude relationship between the quantization error of the variables in each layer calculated by the quantization error calculation unit 12 and the threshold value generated by the threshold value generation unit 14, and determines the data type to be used in learning for each layer (FIG. 4(f) and FIG. 4(g)). Since bit ranges and bit positions of pieces of data to be input to and to be output from each layer are the same as each other, it is possible to reduce a processing amount in the data type determination unit 16 by determining whether or not to quantize the variables for each layer by using the quantization error calculated for each layer.

For example, when the quantization error is higher than the threshold value, it is determined that the floating-point type is used in order to increase the recognition rate, and when the quantization error is equal to or lower than the threshold value, it is determined that the fixed-point type is used because the recognition rate is equivalent to that in a case where the floating-point type is used. Learning in the learning execution period following the type determination period is executed by using the determined data type for each layer (FIG. 4(h)).

After the end of the learning execution period, the next learning cycle is executed (FIG. 4(i)). As described above, quantization errors are calculated by the quantization error calculation unit 12, threshold values are generated by the threshold value generation unit 14, and data types are determined by the data type determination unit 16. The learning cycle illustrated in FIG. 4 is repeatedly executed until learning for a data amount (one epoch) corresponding to the data set input by the user is executed a predetermined number of times (the number of epochs).

Since learning in the type determination period includes various processes, learning time of the type determination period is longer than learning time of the learning execution period when the amount of data to be learned is the same.

The learning time may be longer than learning time for learning the same amount of data by using only floating-point number data. For this reason, for example, it is preferable that the amount of data to be learned in the type determination period be equal to or less than about 10% of the amount of data to be learned in the learning cycle. For example, when the learning cycle is 10 epochs, the type determination period is set to about one epoch. However, a ratio of the type determination period with respect to the learning cycle is not limited to the ratio described above.

By determining the data types to be used for the variables based on the learning in the type determination period, it is possible to suppress that the learning time of the learning cycle becomes long, compared to a case where the data types to be used for the variables are determined with the learning in the learning execution period included. For example, by operating the quantization error calculation unit 12, the threshold value generation unit 14, and the data type determination unit 16 only during the type determination period and stopping the operation during the learning execution period, it is possible to suppress that the learning time of the learning cycle increases.

Figure 5:
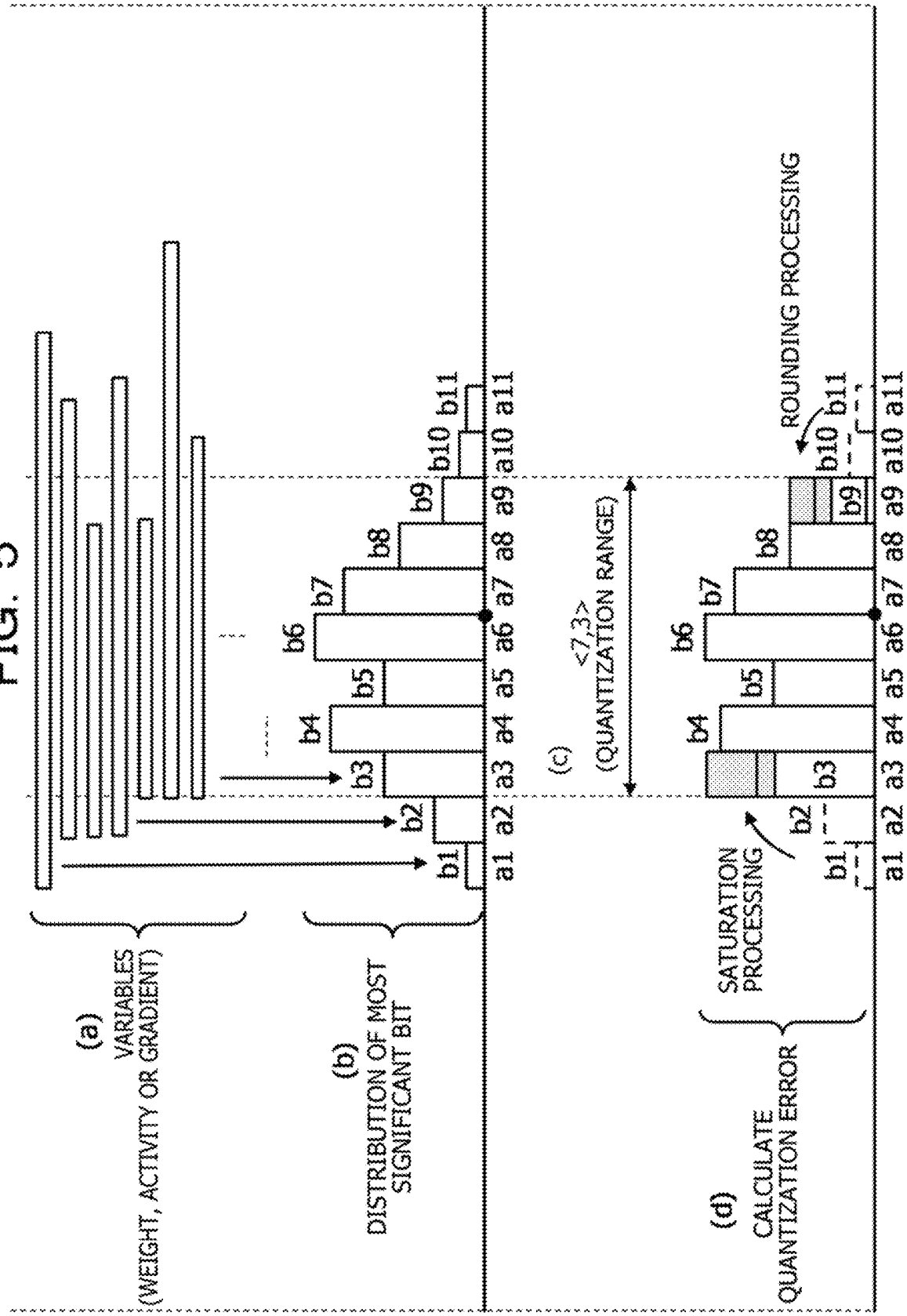
FIG. 5 is an explanatory diagram illustrating an example of a method of acquiring statistical information, a method of determining a quantization range, and a method of calculating a quantization error.

FIG. 5 illustrates an example of a method of acquiring statistical information, a method of determining a quantization range, and a method of calculating a quantization error. FIG. 5(a) illustrates any one of input and output variables (weight, activity, or gradient) by one of the nodes indicated by circles in FIG. 2. For example, it is assumed that an initial weight has a predetermined number of bits (8 bits, 16 bits, or the like) wider than a quantization range illustrated in FIG. 5. Intermediate data (the weight optimized by the activity, the gradient, and learning) is, for example, an arithmetic operation result by the fixed-point arithmetic unit, and is stored in an accumulator (for example, 40 bits) for each execution of an arithmetic operation by a node. The broken lines on both the left side and the right side of FIG. 5 indicate a range of 40 bits.

When the initial weight or the intermediate data is floating-point number data, the floating-point number data is converted into fixed-point number data of 40 bits or less, resulting in the state illustrated in FIG. 5(a). The conversion into the fixed-point number data may be executed by the CPU 10 or may be executed by the accelerator 30.

FIG. 5(b) illustrates a distribution of the most significant bit of the variable as an example of statistical information to be acquired by the quantization error calculation unit 12. For example, the distribution of the variable is acquired for each variable in each layer to be used in the type determination period. In fixed-point number data (positive value), the most significant bit is a bit where "1" appears first on a sign bit S side (FIG. 3). In FIG. 5, each symbol a (a1 to a11) denotes a position of the most significant bit of each intermediate data. Each symbol b (b1 to b11) indicates the number of bins at each bit position. In FIG. 5(b), the left side indicates the upper bit side, and the right side indicates the lower bit side.

The quantization error calculation unit 12 determines a quantization range based on the distribution of the most significant bit of the variable (FIG. 5(c)). In this example, the quantization range is set to <7, 3>, which means that the decimal point position is a position indicated by the black circle. For example, the quantization range is determined for each layer of the neural network.

Next, the quantization error calculation unit 12 calculates, for each variable, a quantization error when the variable (weight, activity, or gradient) of the fixed-point number is converted so as to fall within the determined quantization range (FIG. 5(d)). For example, the quantization error is calculated by performing saturation processing on bits above the most significant bit of the quantization range and performing rounding processing on bits below the least significant bit of the quantization range. In the example illustrated in FIG. 5(d), the quantization error is calculated by Expression (1). Quantization error=|(a1·b1+a2·b2)−(a3·b1+a3·b2)|+|(a10·b10+a11·b11)−(a9·b10+a9·b11)|(1)

In Expression (1), "|" represents an absolute value, and "·" represents a product. The absolute value of a difference between the first term and the second term indicates a saturation error, and the absolute value of a difference between the third term and the fourth term indicates a rounding error. For example, an average value of the calculated quantization errors is calculated for each layer, and the average value of the quantization errors is determined as a quantization error to be compared with a threshold value. For example, the maximum value or a variance of the calculated quantization errors may be calculated for each layer, and the calculated maximum value or variance may be determined as a quantization error to be compared with a threshold value.

In FIG. 5(d), an illustration of the distribution in FIG. 5(b) is used to facilitate understanding of the method of calculating the quantization error, but actually, in each intermediate data in FIG. 5(a), the bits outside the quantization range are subjected to the saturation processing and the rounding processing. In FIG. 5, the quantization error calculation unit 12 calculates the quantization error by executing both the saturation processing and the rounding processing, but may calculate the quantization error by executing either the saturation processing or the rounding processing.

Figure 6:
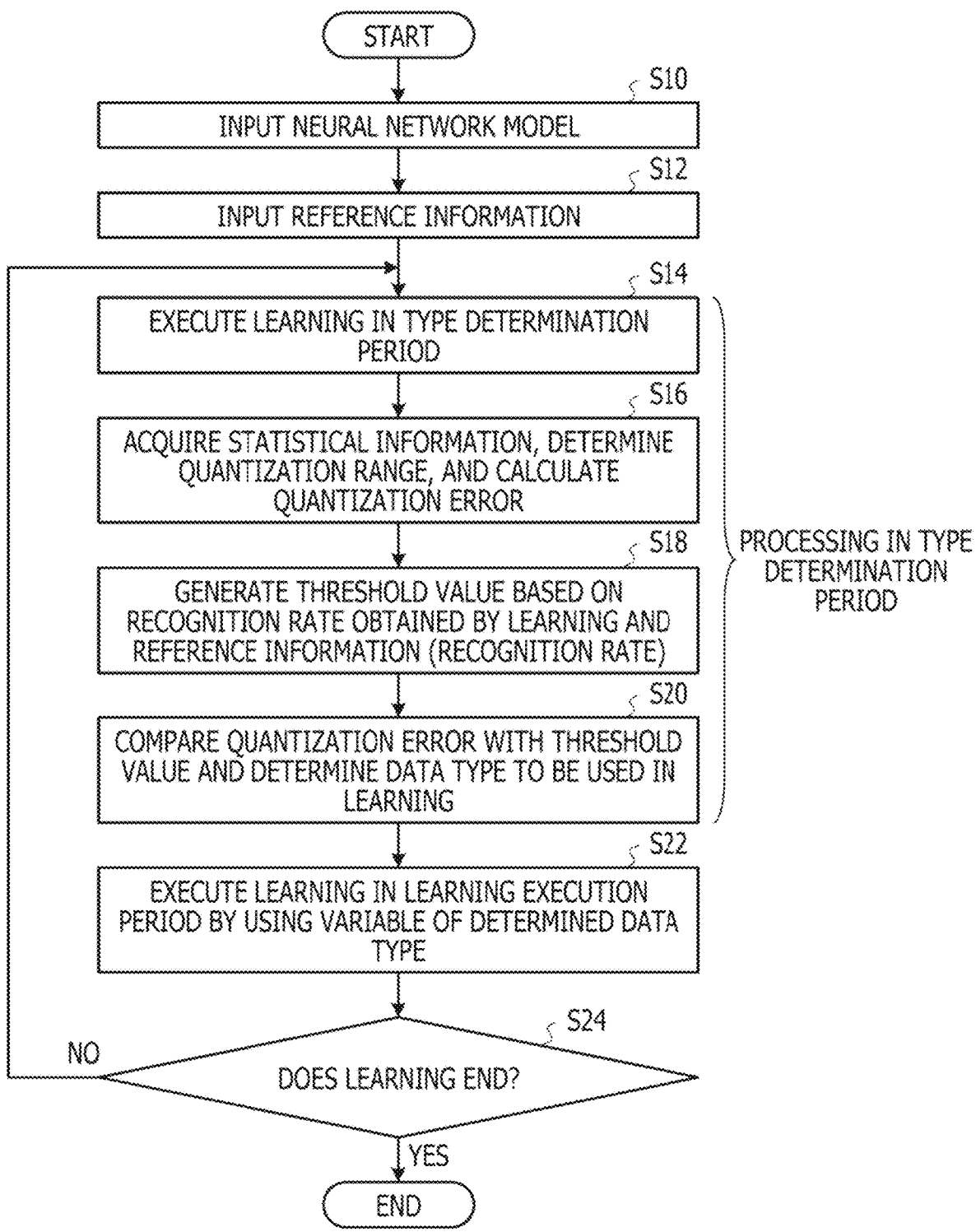
FIG. 6 is a flowchart illustrating an example of the learning of the neural network by the information processing device illustrated in FIG. 1.

FIG. 6 illustrates an example of the learning of the neural network by the information processing device 100 illustrated in FIG. 1. Processing illustrated in FIG. 6 is implemented by the execution of the information processing program by the CPU 10. For example, FIG. 6 illustrates an example of a control method for the information processing device 100 and a control program for the information processing device 100.

First, in step S10, the information processing device 100 stores a neural network model input from the outside in the memory 20 or the like. In step S10, a data set (including weight data) to be used for learning may be input to the information processing device 100 together with the neural network model.

Next, in step S12, the information processing device 100 stores reference information (a recognition rate) input from the outside in the memory 20 or the like. One or both of steps S10 and S12 may be executed in advance separately from the processing illustrated in FIG. 6.

Next, in step S14, the information processing device 100 executes learning of the neural network in a type determination period by using the accelerator 30. Next, in step S16, as described in FIG. 5, the quantization error calculation unit 12 acquires statistical information for each variable (weight, activity, and gradient) in each layer, determines a quantization range (the number of bits and a bit position), and calculates a quantization error for each layer. Next, in step S18, the threshold value generation unit 14 compares a recognition rate obtained by learning with the recognition rate that is the reference information, and generates a threshold value according to the comparison result Steps S16 and S18 may be executed in reverse order or may be executed in parallel.

Next, in step S20, the data type determination unit 16 compares a magnitude relationship between the quantization error calculated by the quantization error calculation unit 12 and the threshold value generated by the threshold value generation unit 14 for each layer, for example, and determines a data type to be used in learning. For example, when the quantization error is higher than the threshold value, it is determined that the floating-point type is used in order to increase the recognition rate, and when the quantization error is equal to or lower than the threshold value, it is determined that the fixed-point type is used because the recognition rate is equivalent to or higher than the floating-point type. The processing from step S14 to step S20 is executed during the type determination period illustrated in FIG. 4.

Next, in step S22, the information processing device 100 executes learning of the neural network in a learning execution period by using a variable of the data type determined in step S20. The learning in the learning execution period of the neural network is executed by using the accelerator 30. Next, in step S24, when the information processing device 100 executes learning of a data amount (one epoch) corresponding to the data set input by the user a predetermined number of times (the number of epochs), the information processing device 100 ends the processing illustrated in FIG. 6. In a case where the information processing device 100 has not executed the learning of the predetermined number of epochs, the information processing device 100 returns the processing to step S14, and executes learning in the type determination period of the next learning cycle.

Figure 7:
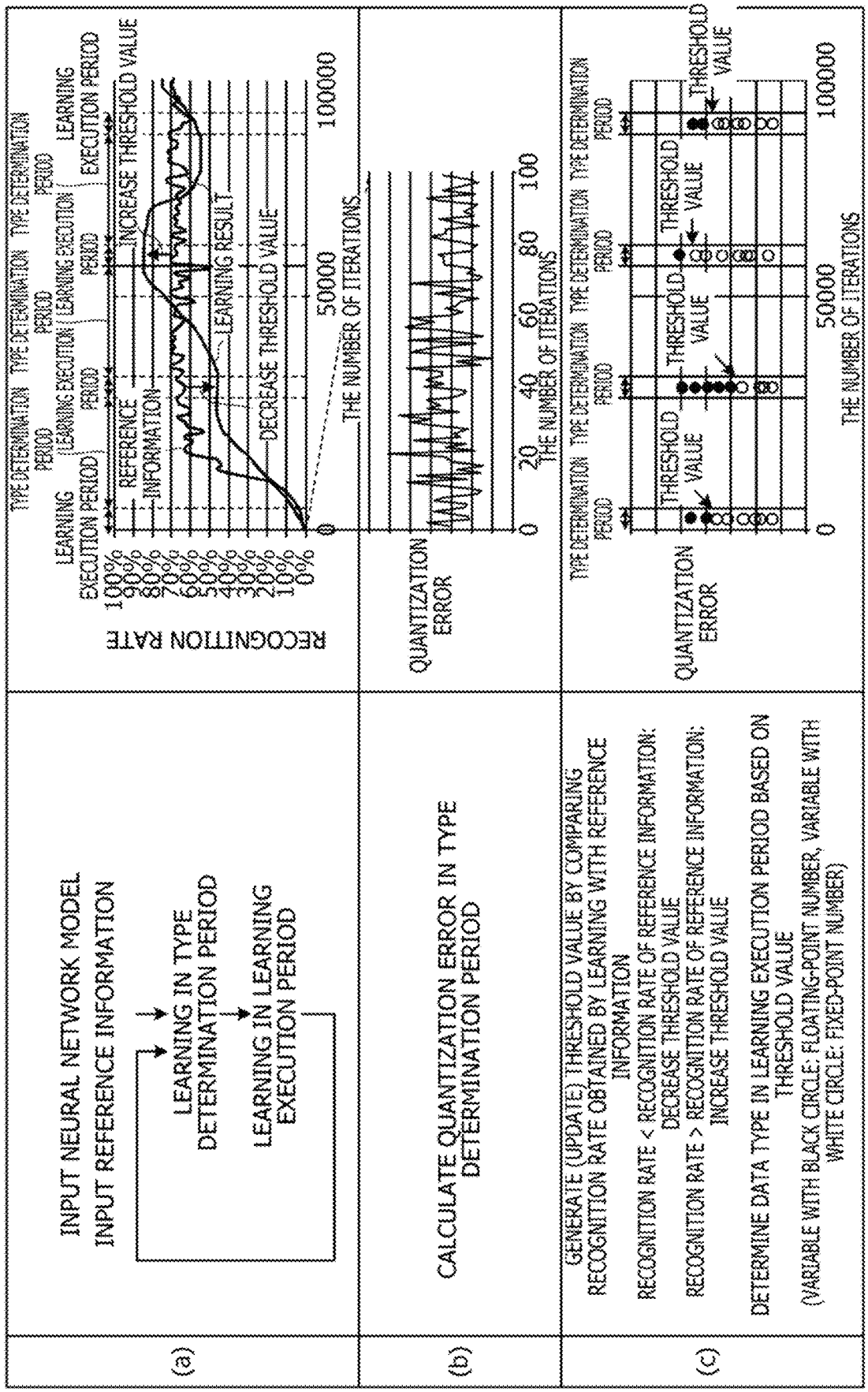
FIG. 7 is an explanatory diagram illustrating an outline of the learning of the neural network by the information processing device illustrated in FIG. 1.

FIG. 7 illustrates an outline of the learning of the neural network by the information processing device 100 illustrated in FIG. 1. FIG. 7(a) illustrates changes in learning. The right side of FIG. 7(a) illustrates changes in recognition rate, the horizontal axis represents the number of iterations, and the vertical axis represents a recognition rate. As described above, after the neural network model and the reference information are input, the learning cycle including the type determination period and the learning execution period is repeatedly executed. The reference information indicates, for example, the recognition rate in the past learning of the neural network by using floating-point number data.

FIG. 7(b) illustrates changes in a quantization error of one of the variables (activity, gradient, or weight) calculated each time when forward propagation processing and backward propagation processing are executed. On the right side of FIG. 7(a), the horizontal axis represents the number of iterations, and the vertical axis represents a quantization error. As illustrated in FIG. 7(b), in the type determination period, first, a quantization error is calculated for each variable in each layer. When the learning in the type determination period ends, the quantization error calculation unit 12 calculates an average value of the quantization errors illustrated in FIG. 7(b) for each layer, for example. The average value of the quantization errors for each layer is indicated by a black circle or a white circle in FIG. 7(c). On the right side of FIG. 7(c), the horizontal axis represents the number of iterations, and the vertical axis represents a quantization error.

As illustrated on the right side of FIG. 7(a), the threshold value generation unit 14 generates (updates) a threshold value based on comparison between a recognition rate obtained by the learning in the type determination period and the recognition rate indicated by the reference information. The threshold value generation unit 14 lowers the threshold value when the recognition rate obtained by the learning is lower than the recognition rate indicated by the reference information in the second and subsequent type determination periods, and raises the threshold value when the recognition rate obtained by the learning is higher than the recognition rate indicated by the reference information. When the recognition rate obtained by the learning is the same as the recognition rate indicated by the reference information, the threshold value generation unit 14 does not update the threshold value.

As illustrated on the right side of FIG. 7(c), the data type determination unit 16 determines to execute the learning in the learning execution period of a layer (a black circle) in which the average value of the quantization errors is higher than the threshold value, by the floating-point type. The data type determination unit 16 determines to execute the learning in the learning execution period of a layer (a white circle) in which the average value of the quantization errors is equal to or lower than the threshold value, by the fixed-point type. As may be seen from a difference between the number of black circles and the number of white circles in FIG. 7(c), as the threshold value correlated with the recognition rate decreases, the number of variables of the floating-point number data to be used for learning increases and the number of variables of the fixed-point number data to be used for learning decreases. As the threshold value increases, the number of variables of the floating-point number data to be used for learning decreases, and the number of variables of the fixed-point number data to be used for learning increases.

The time it takes for the floating-point arithmetic unit to execute an arithmetic operation of floating-point number data is longer than the time it takes for the fixed-point arithmetic unit to execute an arithmetic operation of fixed-point number data. Therefore, as the recognition rate obtained in the type determination period is lower than the recognition rate indicated by the reference information and the threshold value is lower, although the calculation time increases in the subsequent learning execution period, the recognition rate may be brought closer to the recognition rate indicated by the reference information.

On the other hand, as the recognition rate is higher than the recognition rate indicated by the reference information and the threshold value is higher, the recognition rate may be made equivalent to the recognition rate indicated by the reference information in the subsequent learning execution period, and the calculation time may be shortened. Therefore, by changing a ratio between the floating-point number data and the fixed-point number data to be used for the calculation of the neural network according to the recognition rate by learning, it is possible to reduce the calculation time while suppressing a decrease in recognition rate.

Figure 8:
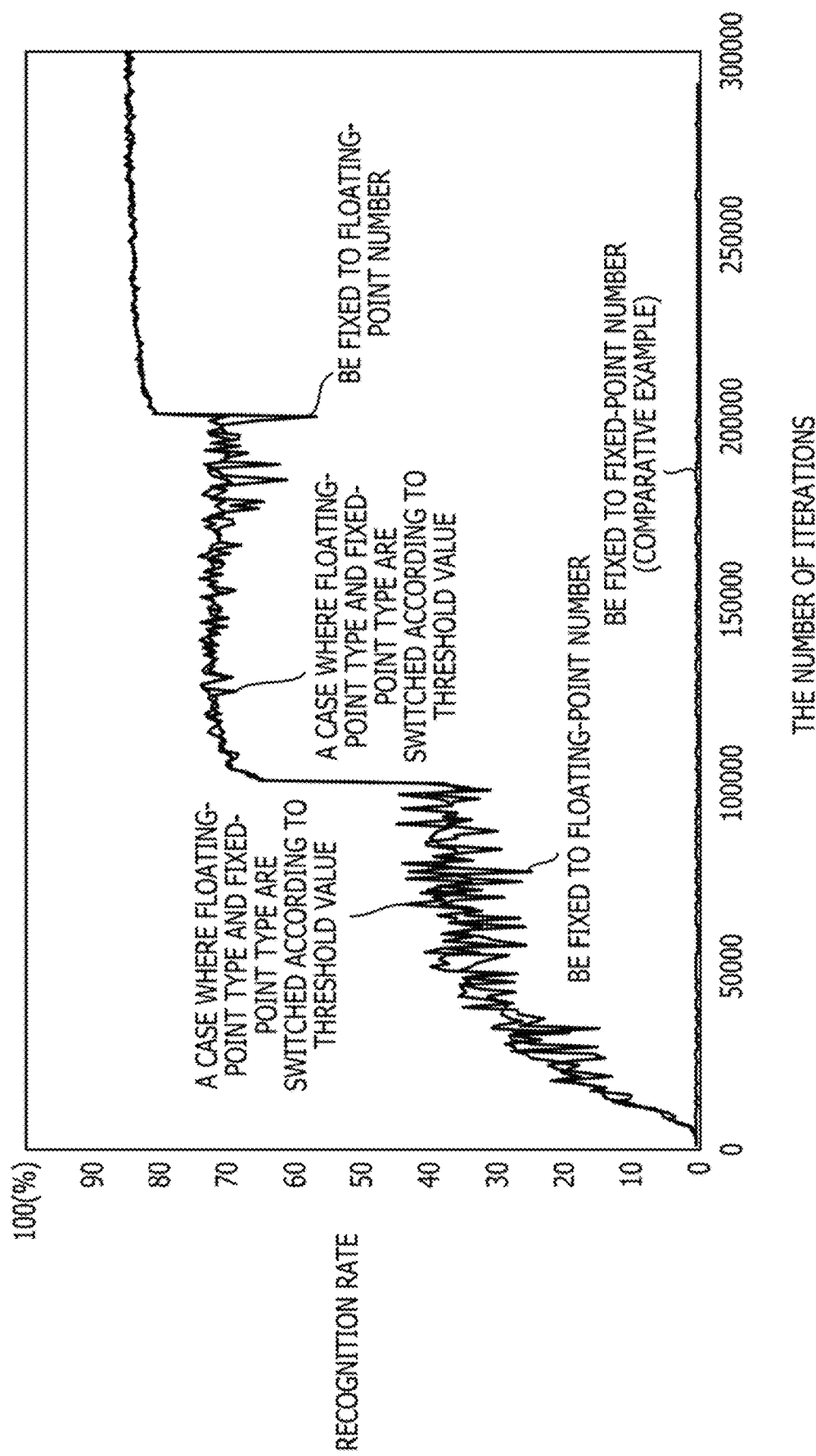
FIG. 8 is an explanatory diagram illustrating an example of changes in recognition rate when learning of a neural network is executed.

FIG. 8 illustrates an example of changes in recognition rate when learning of a neural network is executed. For example, FIG. 8 illustrates an example in which learning of resnet-50 that is a type of learned network is executed by using ImageNet that is a type of a data set, where the horizontal axis indicates the number of iterations and the vertical axis indicates a recognition rate.

As described with reference to FIG. 4, FIG. 6, and the like, in the present embodiment in which the data type to be used for calculation in each layer of the neural network is determined according to the threshold value changed based on the recognition rate, it is possible to make changes in recognition rate similar to those in a case where all the data types are fixed to the floating-point type.

As described above, the time it takes to execute learning by using fixed-point data is shorter than the time it takes to execute learning by using floating-point data. Therefore, when the data type is changed from the floating-point type to the fixed-point type according to the threshold value in at least any one of the plurality of layers, it is possible to reduce the calculation time while suppressing a decrease in recognition rate.

On the other hand, as described as a comparative example, in a case where all the data types are fixed to the fixed-point type under conditions of the data set and the neural network illustrated in FIG. 8, the recognition rate may not be improved even when learning is repeated.

As described above, in this embodiment, the information processing device 100 generates the threshold value of the quantization error based on the respective recognition rates obtained in the current learning and the past learning, and calculates the quantization errors when the variables obtained by the learning are quantized. The information processing device 100 determines variables to be quantized into fixed-point number data among variables to be used in subsequent learning depending on whether the calculated quantization error is larger or smaller than the threshold value.

Accordingly, when the recognition rate is higher than the past recognition rate, a ratio of the variables of fixed-point number data may be relatively increased, and when the recognition rate is lower than the past recognition rate, the ratio of the variables of fixed-point number data may be relatively decreased. By executing the learning of the neural network while changing the ratio of the variables of the fixed-point number data according to the threshold value, it is possible to improve the recognition rate compared to a case where the learning is executed only by using the variables of fixed-point number data. It is possible to shorten the calculation time compared to a case where the learning of the neural network is executed only by using the variables of the floating-point number data. As a result, in the learning of the neural network, it is possible to shorten the calculation time while suppressing a decrease in recognition rate.

By determining the data types to be used for the variables based on the learning in the type determination period, it is possible to suppress that the learning time of the learning cycle becomes long, compared to a case where the data types to be used for the variables are determined with the learning in the learning execution period included. For example, by operating the quantization error calculation unit 12, the threshold value generation unit 14, and the data type determination unit 16 only during the type determination period and stopping the operation during the learning execution period, it is possible to suppress that the learning time of the learning cycle increases.

Since the threshold value is generated based on the recognition rate that is the learning result of the entire neural network, the threshold value generation unit 14 may easily generate one threshold value by comparing the recognition rate obtained by the learning with the past recognition rate. For example, in a case where the distribution of the quantization error is different for each of the types of variables, by generating a plurality of threshold values according to each distribution of the quantization error, it is possible to make the recognition rate in the subsequent learning more likely to approach the recognition rate in the past learning by using the floating-point number data.

Since the bit ranges and the bit positions of pieces of data to be input to and to be output from each layer are the same as each other, the processing amount in the quantization error calculation unit 12 may be reduced by calculating the quantization error by using the common quantization range for each layer. Similarly, the processing amount of the data type determination unit 16 may be reduced by determining the variables to be quantized in each layer by using the quantization error calculated for each layer.

Figure 9:
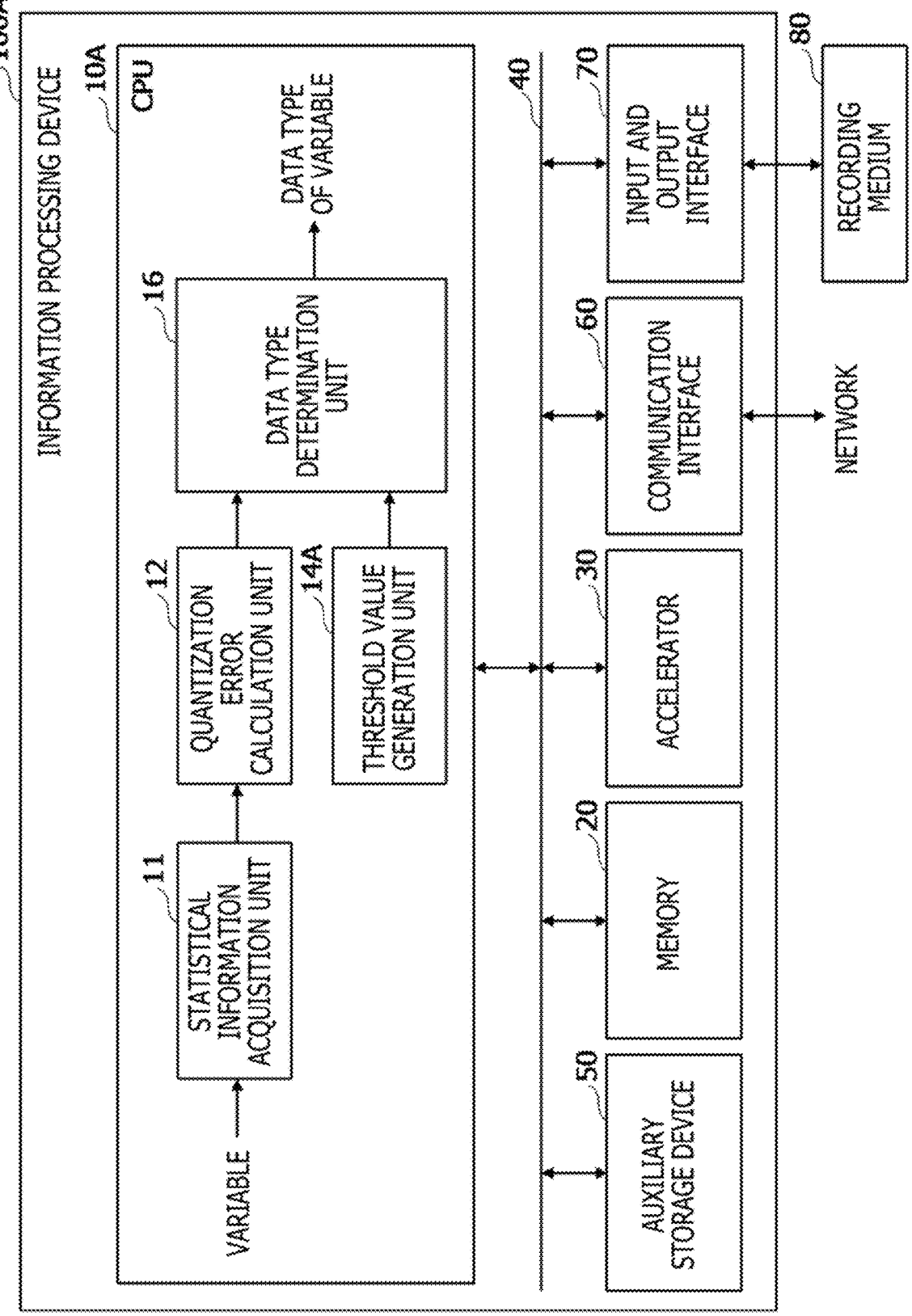
FIG. 9 is a block diagram illustrating an example of an information processing device according to another embodiment.

FIG. 9 illustrates an example of an information processing device according to another embodiment. Constituent elements similar to those illustrated in FIG. 1 are denoted by the same reference signs and detailed description thereof is omitted. Detailed description of contents similar to those in FIG. 2 to FIG. 8 will be omitted. An information processing device 100A illustrated in FIG. 9 is used for learning or inference such as image processing by using a neural network, or is used for both learning and inference.

For example, the information processing device 100A is a server, and includes a CPU 10A, the memory 20, the accelerator 30, an auxiliary storage device 50, a communication interface 60, and an input and output interface 70 that are coupled to one another via the communication bus 40. The information processing device 100A may include a constituent element other than the illustrated constituent elements.

The CPU 10A includes a threshold value generation unit 14A instead of the threshold value generation unit 14 illustrated in FIG. 1, and a statistical information acquisition unit 11 is added to the CPU 10 illustrated in FIG. 1. The threshold value generation unit 14A will be described with reference to FIG. 10. The statistical information acquisition unit 11 acquires statistical information for each variable (weight, activity, or gradient) in each layer to be used for calculation of the neural network illustrated in FIG. 2. Therefore, the quantization error calculation unit 12 does not have a function of acquiring statistical information. The quantization error calculation unit 12 calculates a quantization error for each layer based on the statistical information acquired by the statistical information acquisition unit 11.

The statistical information acquisition unit 11, the quantization error calculation unit 12, the threshold value generation unit 14A, and the data type determination unit 16 are implemented by the execution of an information processing program stored in the memory 20 by the CPU 10A. At least one of the statistical information acquisition unit 11, the quantization error calculation unit 12, the threshold value generation unit 14A, and the data type determination unit 16 may be implemented by hardware.

The auxiliary storage device 50 stores various programs to be executed by the CPU 10A such as an operating system (OS) and an information processing program, data and various variables such as weights to be used for calculation of the neural network, and the like. For example, the programs stored in the auxiliary storage device 50 are transferred to the memory 20 and are executed by the CPU 10A. The data and various variables to be used for the calculation of the neural network that are stored in the auxiliary storage device 50 are transferred from the auxiliary storage device 50 to the memory 20 when learning of the neural network is executed.

The communication interface 60 has a function of communicating with another information processing device and the like via a network, for example. Therefore, a plurality of information processing devices may be used to execute the calculation of the neural network in parallel. The input and output interface 70 has a function of inputting data from and outputting data to a recording medium 80 coupled to the information processing device 100A.

For example, the recording medium 80 is a Compact Disc (CD: registered trademark), a Digital Versatile Disc (DVD: registered trademark), a Universal Serial Bus (USB) memory, or the like, and the information processing program may be recorded therein. The information processing program recorded in the recording medium 80 is transferred to the auxiliary storage device 50 via the input and output interface 70, and then is developed over the memory 20 and executed by the CPU 10A.

Figure 10:
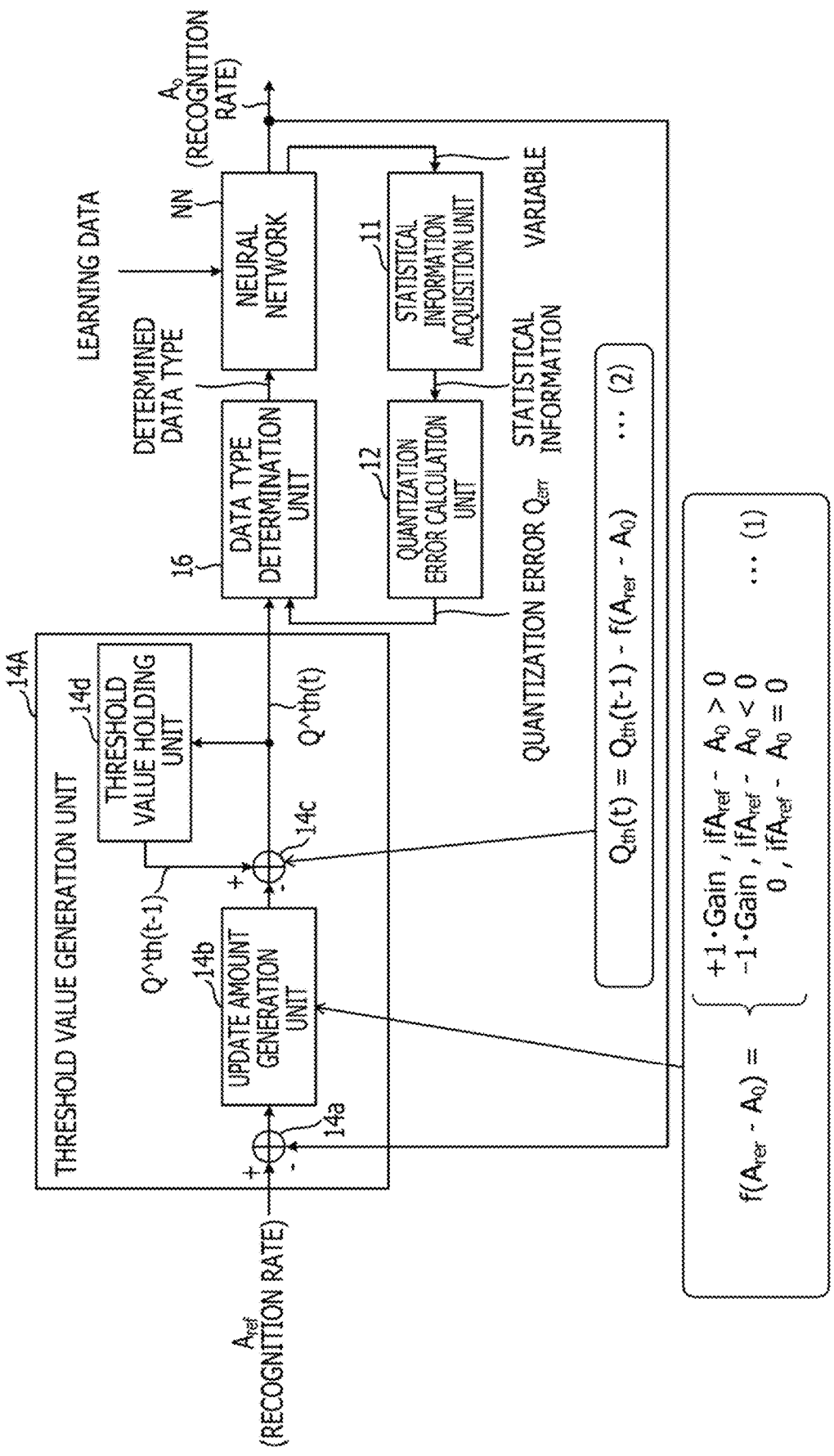
FIG. 10 is a functional block diagram illustrating an example of processing to be executed by the information processing device in FIG. 9.

FIG. 10 illustrates an example of processing to be executed by the information processing device 100A in FIG. 9. The threshold value generation unit 14A includes a difference calculation unit 14a, an update amount generation unit 14b, a difference calculation unit 14c, and a threshold value holding unit 14d. The threshold value generation unit 14A generates (updates) a threshold value Qth(t) for determining the data types of the variables to be used in the learning execution period of the learning cycle every time the learning of the type determination period illustrated in FIG. 4 ends.

For example, the threshold value Qth(t) is commonly used for all layers and all variables. Therefore, it is sufficient that the information processing device 100A includes one threshold value generation unit 14A, so that a scale of the information processing program or a scale of the hardware may be reduced as compared with a case where the information processing device 100A includes a plurality of threshold value generation units 14A.

The difference calculation unit 14a calculates a difference between a recognition rate Aref (reference information) input to the information processing device 100A by an operation of a user or the like and a recognition rate Ao obtained by learning of the neural network, and outputs the calculated difference to the update amount generation unit 14b. For example, the recognition rate Ao is an average value of recognition rates obtained for respective mini-batches that are executed a plurality of times in the type determination period. The recognition rate Ao may be the maximum value or the minimum value among the recognition rates obtained for the respective mini-batches. The recognition rate Aref has been obtained in advance by the past learning of the neural network by using floating-point number data.

The update amount generation unit 14b calculates a value of a function f(Aref−Ao) according to the difference between the recognition rate Aref and the recognition rate Ao as represented in Expression (1) in FIG. 10, and outputs the calculated value to the difference calculation unit 14c. When the recognition rate Aref is larger than the recognition rate Ao, the value of the function f(Aref−Ao) becomes +Gain in order to increase the recognition rate Ao by increasing a usage rate of floating-point number data in the learning execution period of the learning cycle. When the recognition rate Aref is smaller than the recognition rate Ao, the value of the function f(Aref−Ao) becomes −Gain in order to increase a usage rate of fixed-point number data in the learning execution period of the learning cycle to shorten the calculation time. For example, Gain is a predetermined positive value. The value of the function f(Aref−Ao) becomes 0 when the recognition rate Aref is equal to the recognition rate Ao.

As represented in Expression (2) in FIG. 10, the difference calculation unit 14c subtracts the value of the function f(Aref−Ao) from the threshold value Qth(t−1) that is calculated in the type determination period of the immediately previous learning cycle and that is held by the threshold value holding unit 14d to calculate the threshold value Qth(t) to be used in the learning cycle. The value of the function f(Aref−Ao) is "+Gain", "−Gain", or "0". The difference calculation unit 14c outputs the calculated threshold value Qth(t) to the data type determination unit 16 and the threshold value holding unit 14d. The difference calculation unit 14c is an example of a threshold value calculation unit that calculates the threshold value Qth(t) after updating.

For example, when the recognition rate Aref is larger than the recognition rate Ao, the threshold value Qth(t) becomes smaller than the threshold value Qth(t−1). When the recognition rate Aref is smaller than the recognition rate Ao, the threshold value Qth(t) becomes larger than the threshold value Qth(t−1). When the recognition rate Aref is equal to the recognition rate Ao, the threshold value Qth(t) becomes the same value as the threshold value Qth(t−1). The threshold value holding unit 14d holds the threshold value Qth(t) and outputs the held threshold value Qth(t) to the difference calculation unit 14c in the type determination period of the next learning cycle.

As described above, by generating the value of the function f(Aref−Ao) indicating an increase or decrease amount for updating the threshold value Qth(t) based on the difference between the recognition rate Aref and the recognition rate Ao, the threshold value Qth(t) may be generated by using the immediately previous threshold value Qth(t−1). As a result, it is possible to suppress a rapid change in threshold value Qth(t) with respect to the immediately previous threshold value Qth(t−1), and to suppress a rapid change in recognition rate.

The threshold value holding unit 14d holds a standard threshold value in an initial state. Accordingly, the threshold value generation unit 14A may generate the threshold value Qth(t) in the type determination period of the first learning cycle in which the threshold value has not been updated even once.

The data type determination unit 16 compares, for each variable in each layer, a magnitude relationship between a quantization error Qerr of the variable of each layer calculated by the quantization error calculation unit 12 and the threshold value Qth(t) updated by the threshold value generation unit 14A in a similar manner to each description in FIG. 4(f), FIG. 4(g), and FIG. 7(c). The data type determination unit 16 determines a data type to be used in learning for each layer based on the comparison result. The information processing device 100A uses the accelerator 30 to execute learning in the learning execution period in FIG. 4 by using the determined data type. The recognition rate Ao is an average value or the like of the recognition rates for respective mini-batches of learning in the type determination period and the learning execution period in each learning cycle. The feedback of the recognition rate Ao to the threshold value generation unit 14A is performed only during the type determination period, and is not performed during the learning execution period.

Activities, gradients, and weights for the respective layers calculated by the learning of the neural network in the type determination period are output to the statistical information acquisition unit 11. For example, the statistical information acquisition unit 11 acquires statistical information of each of the activities, the gradients, and the weights for the respective layers, and outputs the acquired statistical information to the quantization error calculation unit 12. For example, as described in FIG. 5, the statistical information is a distribution of the most significant bit of each of the variables (weights, gradients, and activities) represented by fixed-point number data. When a variable used in the neural network is floating-point number data, the statistical information is acquired as fixed-point number data. When floating-point number data is converted into fixed-point number data, conversion processing may be executed by the statistical information acquisition unit 11, the CPU 10A, or the accelerator 30.

As described in FIG. 5, the quantization error calculation unit 12 determines a quantization range of the fixed-point number data based on the statistical information. The quantization error calculation unit 12 calculates, for each variable, a quantization error in a case where the variable (weight, activity, or gradient) of the fixed-point number is converted so as to fall within the determined quantization range. The quantization error calculation unit 12 calculates, for example, the quantization error Qerr for each layer based on the quantization error calculated for each variable, and outputs the calculated quantization error Qerr to the data type determination unit 16.

Figure 11:
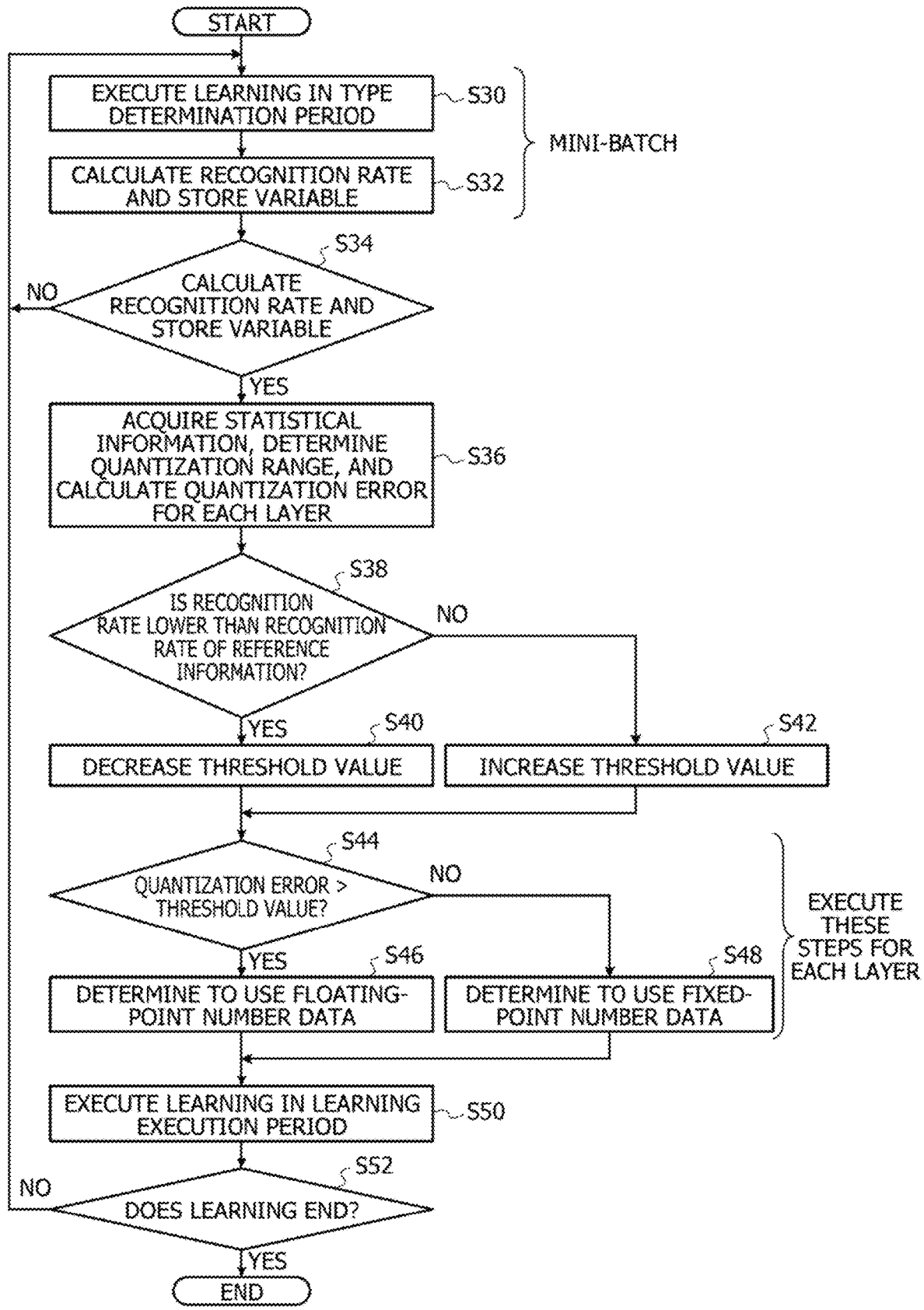
FIG. 11 is a flowchart illustrating an example of learning of a neural network by the information processing device illustrated in FIG. 9.

FIG. 11 illustrates an example of learning of the neural network by the information processing device 100A illustrated in FIG. 9. The processing illustrated in FIG. 11 is implemented by the execution of the information processing program by the CPU 10A. For example, FIG. 11 illustrates an example of a control method of the information processing device 100A and a control program of the information processing device 100A. Detailed description of processing similar to that illustrated in FIG. 6 will be omitted. Before processing in FIG. 11 is started, the input of the neural network model and the reference information to the information processing device 100A in steps S10 and S12 in FIG. 6 has been completed.

First, in step S30, the information processing device 100A executes learning (mini-batch) of the neural network in the type determination period by using the accelerator 30. Next, in step S32, the information processing device 100A calculates a recognition rate in learning of a mini-batch. The information processing device 100A stores variables (activity, gradient, and weight) calculated in the learning of the mini-batch in the memory 20 or the like.

Next, in step S34, in a case where the information processing device 100A has executed a predetermined number of mini-batches corresponding to the type determination period, the processing proceeds to step S36, and in a case where the information processing device 100A has not executed the predetermined number of mini-batches corresponding to the type determination period, the processing returns to step S30.

In a case where all the mini-batches (learning) in the type determination period has been completed, in step S36, the information processing device 100A acquires statistical information for each variable (weight, activity, and gradient) in each layer, similarly to step S16 in FIG. 6. The information processing device 100A determines a quantization range (the number of bits and a bit position), and calculates a quantization error for each layer. For example, the processing in step S36 is executed by the quantization error calculation unit 12.

Next, in step S38, the information processing device 100A determines, for example, whether or not an average value of the recognition rates for the respective mini-batches obtained in step S32 is lower than the recognition rate of the reference information. When the average value of the recognition rates is lower than the recognition rate of the reference information, the processing proceeds to step S40, and when the average value of the recognition rates is equal to or higher than the recognition rate of the reference information, the processing proceeds to step S42.

In step S40, the information processing device 100A decreases the threshold value generated in the type determination period of the immediately previous learning cycle to update the threshold value for determining a data type to be used in the learning execution period of the current learning cycle, and the processing proceeds to step S44. In step S42, the information processing device 100A increases the threshold value generated in the type determination period of the immediately previous learning cycle to generate a threshold value for determining a data type to be used in the learning execution period of the current learning cycle, and the processing proceeds to step S44. The processing of steps S40 and S42 is executed by the threshold value generation unit 14A.

In step S44, the information processing device 100A determines whether or not an average value of quantization errors is larger than the threshold value for each layer, similarly to step S20 in FIG. 6. When the quantization error is larger than the threshold value, the processing proceeds to step S46, and when the quantization error is equal to or smaller than the threshold value, the processing proceeds to step S48. The processing of steps S44, S46, and S48 is executed for each layer.

In step S46, the information processing device 100A determines to use floating-point number data in calculation for a target layer, and the processing proceeds to step S50. In step S48, the information processing device 100A determines to use fixed-point number data in calculation for a target layer, and the processing proceeds to step S50.

In step S50, the information processing device 100A executes learning of the neural network in the learning execution period by using the data type for each layer determined in step S46 or step S48, similarly to step S22 in FIG. 6. Next, in step S52, the information processing device 100A ends the processing illustrated in FIG. 11 when learning of all learning cycles is ended. When there is an unexecuted learning cycle, the information processing device 100A returns the processing to step S30 and executes the next learning cycle.

The changes in recognition rate in the embodiment illustrated in FIG. 9 to FIG. 11 are similar to the changes in recognition rate in a case where the floating-point type and the fixed-point type are switched according to the threshold value in FIG. 8, and are similar to the changes in recognition rate in a case where all data types are fixed to the floating-point type.

Thus, according to the embodiment described with reference to FIG. 9 to FIG. 11, effects that are similar to those obtained in the embodiment described with reference to FIG. 1 to FIG. 8 may be obtained. For example, when the recognition rate is higher than the past recognition rate, a ratio of the variables of the fixed-point number data may be relatively increased, and when the recognition rate is lower than the past recognition rate, a ratio of the variables of the fixed-point number data may be relatively decreased. By executing the learning of the neural network while changing the ratio of the variables of the fixed-point number data according to the threshold value, it is possible to improve the recognition rate compared to a case where the learning is executed only by using the variables of fixed-point number data. It is possible to shorten the calculation time compared to a case where the learning of the neural network is executed only by using the variables of the floating-point number data. As a result, in the calculation of the neural network, it is possible to shorten the calculation time while suppressing a decrease in recognition rate. For example, in learning of the neural network, it is possible to shorten calculation time while suppressing a decrease in recognition rate.

In the embodiment described with reference to FIG. 9 to FIG. 11, the threshold value generation unit 14A generates a value of the function f(Aref−Ao) indicating an increase or decrease amount for updating the threshold value Qth(t)

based on a difference between the recognition rate Aref and the recognition rate Ao. The threshold value Qth(t) may be generated by using the immediately previous threshold value Qth(t−1). As a result, it is possible to suppress a rapid change in threshold value Qth(t) with respect to the immediately previous threshold value Qth(t−1), and to suppress a rapid change in recognition rate.

Figure 12:
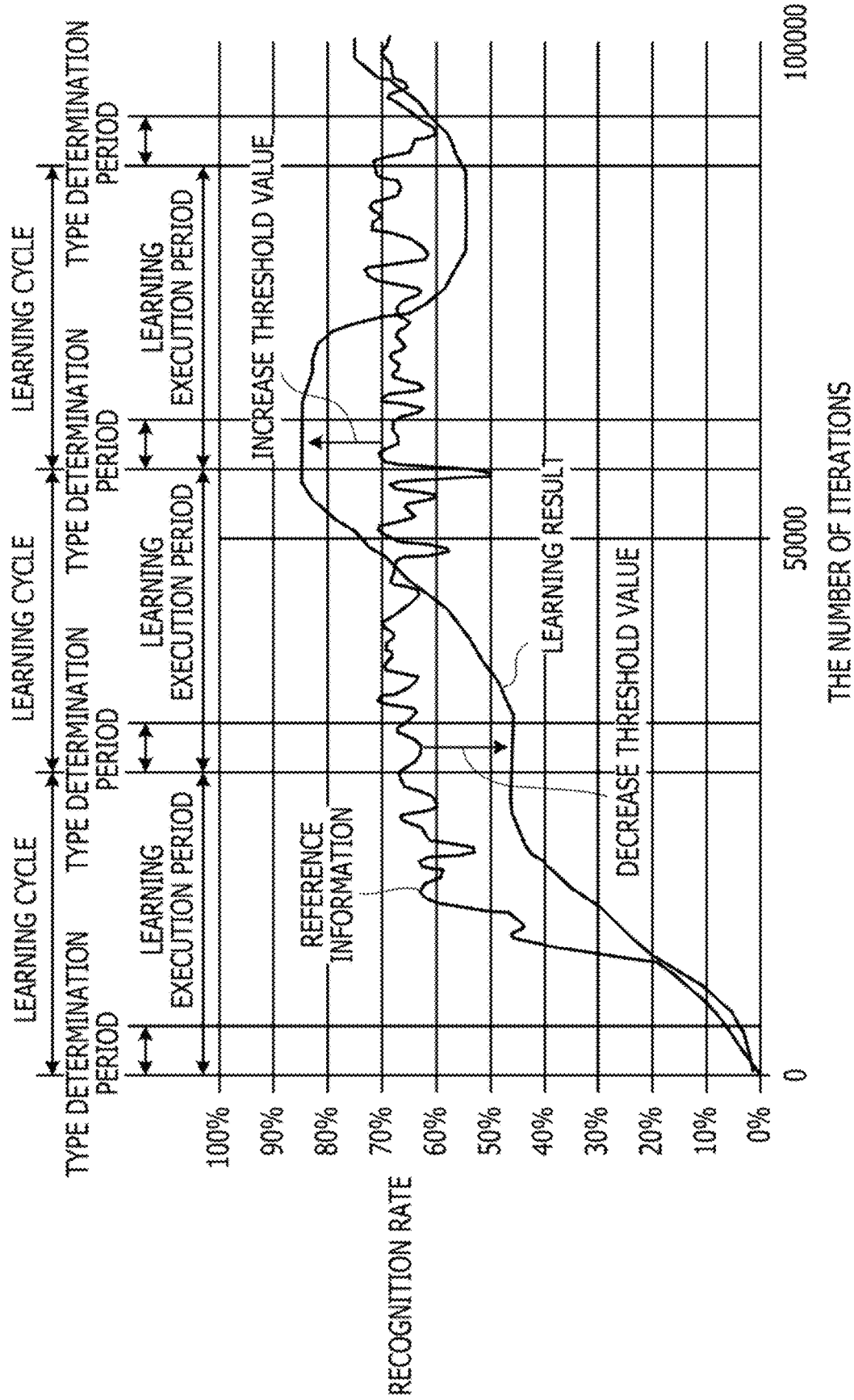
FIG. 12 is an explanatory diagram illustrating an example of learning of a neural network by an information processing device according to another embodiment.

FIG. 12 illustrates an example of learning of a neural network by an information processing device according to another embodiment. Detailed description of the same constituent elements as those of the above-described embodiment is omitted, and the information processing device that executes the learning of the neural network illustrated in FIG. 12 has a configuration similar to that of the information processing device 100 illustrated in FIG. 1.

Changes in learning according to this embodiment are similar to those illustrated on the right side of FIG. 7(a) except that a start point of the learning execution period coincides with a start point of the type determination period. For example, in each learning cycle, the information processing device determines data types of variables to be used for calculation of the neural network in the type determination period. By using the data types of the variables determined in the type determination period, learning is executed in the learning execution period with the learning data used in the type determination period included.

For example, in the type determination period, all variables to be used for calculation of the neural network are quantized, and thus a recognition rate tends to decrease. Therefore, by setting the start point of the learning execution period to be the same as the start point of the type determination period, it is possible to reduce a period in which the variables are quantized in learning of the neural network compared to the changes in learning illustrated on the right side of FIG. 7(a). As a result, the recognition rate of the neural network to be learned may be improved.

As described above, also in this embodiment, effects similar to those of the embodiments described with respect to FIG. 1 to 11 may be obtained. For example, when the recognition rate is higher than the past recognition rate, a ratio of the variables of the fixed-point number data may be relatively increased, and when the recognition rate is lower than the past recognition rate, a ratio of the variables of the fixed-point number data may be relatively decreased.

In the embodiment illustrated in FIG. 12, the recognition rate of the neural network to be learned may be improved by matching the start point of the learning execution period with the start point of the type determination period in each learning cycle.

In the above-described embodiment, the example has been given in which the threshold value is generated (updated) by comparing the reference information indicating the recognition rate when the learning is performed by using floating-point number data with the recognition rate obtained by the learning in the type determination period. However, the reference information may be a loss function (train loss) in learning by using floating-point number data or a loss function (test loss) in testing by using floating-point number data in evaluation after learning. In this case, the threshold value generation unit 14 generates (updates) the threshold value by comparing a loss function by using floating-point number data with a loss function obtained by learning in the type determination period.

In the above-described embodiment, the example has been given in which a threshold value is generated according to a recognition rate in learning of the neural network, and a data type to be used for learning is determined according to a magnitude relationship between the threshold value and a quantization error. However, at the time of inference of the neural network, a threshold value may be generated according to a recognition rate, and a data type to be used for inference may be determined according to a magnitude relationship between the threshold value and a quantization error.

In this case, for example, the learning cycle in FIG. 4 is changed to an inference cycle, and the learning execution period in FIG. 4 is changed to an inference execution period. A length of the inference cycle is set to an arbitrary length according to a target object of inference to be executed by an inference system. The terms "execute learning in type determination period" in step S14 in FIG. 6 is changed to the terms "execute inference in type determination period". The terms "recognition rate obtained by learning" in step S18 in FIG. 6 is changed to the terms "recognition rate obtained by inference". The terms "determine data type to be used in learning" in step S20 in FIG. 6 is changed to the terms "determine data type to be used in inference". The terms "execute learning in learning execution period" in step S22 in FIG. 6 is changed to the terms "execute inference in inference execution period". Also in FIG. 7, "learning" is changed to "inference".

Accordingly, it is possible to obtain effects similar to the case where the threshold value is generated according to the recognition rate and the data type to be used for learning is determined according to the magnitude relationship between the threshold value and the quantization error in learning of the neural network. For example, by executing the inference of the neural network while changing a ratio of variables of fixed-point number data according to the threshold value, it is possible to improve the recognition rate compared to a case where the inference is executed only by variables of fixed-point number data. It is possible to shorten calculation time as compared with a case where the inference of the neural network is executed only by variables of floating-point number data. As a result, in the inference of the neural network, it is possible to shorten the calculation time while suppressing a decrease in recognition rate.

In the above-described embodiment, the example has been given in which the quantization error calculation unit 12 calculates the average value of the quantization errors for each layer and uses the calculated average value to determine the data type to be used in the learning execution period. However, the quantization error calculation unit 12 may calculate the maximum value among the quantization errors for each layer and may use the maximum value to determine the data type to be used in the learning execution period. When the maximum value among the quantization errors is calculated, the threshold value generation unit 14 generates (updates) the threshold value corresponding to the maximum value based on comparison between the recognition rate obtained by learning and the recognition rate indicated by the reference information.

Alternatively, the quantization error calculation unit 12 may calculate the variance of the quantization errors for each layer and use the variance to determine the data type to be used in the learning execution period. When the variance of the quantization errors is calculated, the threshold value generation unit 14 generates (updates) a threshold value indicated by the variance based on comparison between the recognition rate obtained by learning and the recognition rate indicated by the reference information. When the variance of the quantization errors is wider than the variance indicated by the threshold value, the data type determination unit 16 determines to execute learning in the learning execution period by using the floating-point type. When the variance of the quantization errors is narrower than the variance indicated by the threshold value, the data type determination unit 16 determines to execute learning in the learning execution period by using the fixed-point type.

In the above-described embodiment, the example has been given in which the data types of all the variables (weights, activities, and gradients) to be used for the calculation of the neural network are switched. However, the data types of only predetermined variables (for example, only the weights and the activities or only the gradients) may be switched, and the data types of other variables may be fixed. For example, the data type may be switched only for a variable specified by a designer (such as a user) of the neural network, and the data type may be fixed for the other variables. As a result, the processing amount of the data type determination unit 16 may be reduced. Since it is possible to reduce the calculation number of quantization errors to be used to determine the data type, the processing amount of the quantization error calculation unit 12 may be reduced.

In a case where a layer having high effects of suppressing a decrease in recognition rate and shortening the calculation time by switching the data type to the fixed-point type has been known in advance, the data type of variables to be used in the layer may be fixed to the fixed-point type. Alternatively, in a case where a layer of which the recognition rate is not affected between the case where only fixed-point number data is used and the case where the data type is switched has been known in advance, the data type of variables to be used in the layer may be fixed to the fixed-point type. As a result, the processing amount of the quantization error calculation unit 12 and the processing amount of the data type determination unit 16 may be reduced as described above.

In the above-described embodiment, the example has been given in which the threshold value common to all layers and all variables is generated. However, a threshold value may be generated for each predetermined variable. For example, three threshold values may be generated corresponding to the respective weight, activity, and gradient.

Concerning the embodiments described with reference to FIG. 1 to FIG. 11, the following appendices will be further disclosed.

APPENDIX 1

An information processing device including a processor, wherein
the processor is
configured to calculate a quantization error when a variable to be used in a neural network is quantized,
configured to generate a threshold value based on reference information related to a first recognition rate obtained by past learning of the neural network and a second recognition rate that is obtained by calculation of the neural network,
configured to determine a variable to be quantized among variables to be used for calculation of the neural network based on the calculated quantization error and the generated threshold value, and
configured to execute the calculation of the neural network by using the variable of the determined data type.

APPENDIX 2

The information processing device according to appendix 1, wherein
the processor executes calculation of the neural network by dividing the calculation into a plurality of calculation cycles, and
the step for executing the calculation of the neural network includes, in each of the plurality of calculation cycles,
in a type determination period in which a variable to be quantized is determined, executing the calculation of the neural network by using a variable of a data type determined in immediately previous one of the calculation cycle, and
in a calculation execution period after the type determination period, executing the calculation of the neural network by using the variable of the determined data type.

APPENDIX 3

The information processing device according to appendix 2, wherein
the step for calculating a quantization error, the step for generating a threshold value, and the step for determining a variable to be quantized are executed in the type determination period and are not executed in the calculation execution period.

APPENDIX 4

The information processing device according to any one of appendices 1 to 3, wherein
the step for generating a threshold value includes
calculating a first difference between the first recognition rate indicated by the reference information and the second recognition rate,
generating an update amount of the threshold value based on the calculated first difference, and
calculating a threshold value after updating based on the generated update amount and the current threshold value.

APPENDIX 5

The information processing device according to any one of appendices 1 to 4, wherein
the step for generating a threshold value includes generating the single threshold value, and
the step for determining a variable to be quantized includes determining the variable to be quantized among all the variables based on the generated common threshold value.

APPENDIX 6

The information processing device according to any one of appendices 1 to 4, wherein
the step for generating a threshold value includes generating the threshold value for each type of the variables, and
the step for determining a variable to be quantized includes determining the variable to be quantized for each type of the variables based on the generated threshold value for each type.

APPENDIX 7

The information processing device according to any one of appendices 1 to 6, wherein
the step for determining a variable to be quantized includes
determining a data type of a first variable among a plurality of variables to be used in the neural network based on the quantization error and the threshold value, and
fixing a data type of a second variable other than the first variable to a fixed-point type.

APPENDIX 8

The information processing device according to any one of appendices 1 to 7, wherein
the step for calculating a quantization error includes calculating the quantization error of a variable to be used in each layer for each of a plurality of layers included in the neural network.

APPENDIX 9

The information processing device according to appendix 8, wherein
the step for determining a variable to be quantized includes determining the variable to be quantized by a unit of the variables to be used in each layer based on the calculated quantization error and the generated threshold value.

APPENDIX 10

The information processing device according to any one of appendices 1 to 9, wherein
the step for executing the calculation of the neural network includes executing learning of the neural network by using the variable of the determined data type.

APPENDIX 11

The information processing device according to appendix 10, wherein
the variables include a weight, an activity, and a gradient.

APPENDIX 12

The information processing device according to any one of appendices 1 to 9, wherein
the step for executing the calculation of the neural network includes executing inference of the neural network by using the variable of the determined data type.

APPENDIX 13

The information processing device according to any one of appendices 1 to 12, wherein
the information processing device is configured to acquire statistical information of the variable calculated by the calculation of the neural network, and
the step for calculating the quantization error includes determining a bit range after quantization of the variable based on the acquired statistical information, and calculating the quantization error according to the determined bit range.

APPENDIX 14

The information processing device according to appendix 13, wherein
the step for acquiring the statistical information of the variable incudes acquiring a distribution of a most significant bit of the variable calculated by the calculation of the neural network as the statistical information, and
the step for calculating a quantization error includes determining the bit range based on the distribution that is the acquired statistical information.

APPENDIX 15

An information processing method for causing a processor included in an information processing device to execute a process, the process including
calculating a quantization error when a variable to be used in a neural network is quantized,
generating a threshold value based on reference information related to a first recognition rate obtained by past learning of the neural network and a second recognition rate that is obtained by calculation of the neural network,
determining a variable to be quantized among variables to be used for calculation of the neural network based on the calculated quantization error and the generated threshold value, and
executing calculation of the neural network by using the variable of the determined data type.

APPENDIX 16

An information processing program for causing a processor included in an information processing device to execute a process, the process including
calculating a quantization error when a variable to be used in a neural network is quantized,
generating a threshold value based on reference information related to a first recognition rate obtained by past learning of the neural network and a second recognition rate that is obtained by calculation of the neural network,
determining a variable to be quantized among variables to be used for calculation of the neural network based on the calculated quantization error and the generated threshold value, and
executing calculation of the neural network by using the variable of the determined data type.

Features and advantages of the embodiments would be apparent from the foregoing detailed description. The scope of claims is intended to cover the features and advantages of the embodiments as described above without departing from the spirit and scope of the claims. Any person having ordinary knowledge in the art may readily conceive of any improvements and changes. Accordingly, there is no intention to limit the scope of the inventive embodiments to those described above, and it is possible to rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device, comprising:
   a memory; and
   a processor coupled to the memory and configured to:
   acquire statistical information regarding distribution of positions of most significant bits of operation result for calculation of a neural network for a first period, the operation result being obtained by using a first variable that is quantized to a first fixed-point type, the first variable being a variable among variables to be used for the calculation of the neural network,
   generate a threshold value based on reference information related to a first recognition rate obtained by calculation of the neural network when the first variable that is a floating-point type is used and a second recognition rate that is obtained by the calculation of the neural network for the first period,
   determine a second fixed-type for quantizing the first variable for calculation of the neural network for the second period after the first period based on the statistical information,
   calculate a quantization error of the first variable between the second fixed-point type and the floating-point type, and
   execute the calculation of the neural network for the second period by using the first variable of the second fixed-point type when the quantization error is less than or equal to the threshold.

2. The information processing device according to claim 1, wherein the processor is configured to:
   calculate a first difference between the first recognition rate indicated by the reference information and the second recognition rate,
   generate an update amount of the threshold value based on the calculated first difference, and
   calculate a threshold value after updating based on the generated update amount and the current threshold value.

3. The information processing device according to claim 1, wherein the processor is configured to:
   generate a threshold value includes generating the single threshold value, and
   determine a variable to be quantized includes determining the variable to be quantized among all the variables based on the generated single threshold value.

4. The information processing device according to claim 1, wherein the processor is configured to:
   generate a threshold value includes generating the threshold value for each type of the variables, and
   determine a variable to be quantized includes determining the variable to be quantized for each type of the variables based on the generated threshold value for each type.

5. The information processing device according to claim 1, wherein the processor is configured to calculate the quantization error of a variable to be used in each layer for each of a plurality of layers included in the neural network.

6. The information processing device according to claim 1, wherein the processor is configured to determine the first variable by a unit of the variables to be used in each layer based on the calculated quantization error and the generated threshold value.

7. The information processing device according to claim 1, wherein the processor is configured to execute learning of the neural network by using the variable of the second fixed-point type.

8. The information processing device according to claim 1, wherein the processor is configured to execute inference of the neural network by using the first variable of the second fixed-point type.

9. An information processing method executed by a computer, the information processing method comprising:
   acquiring statistical information regarding distribution of positions of most significant bits of operation result for calculation of a neural network for a first period, the operation result being obtained by using a first variable that is quantized to a first fixed-point type, the first variable being a variable among variables to be used for the calculation of the neural network,
   generating a threshold value based on reference information related to a first recognition rate obtained by calculation of the neural network when the first variable that is a floating-point type is used and a second recognition rate that is obtained by the calculation of the neural network for the first period,
   determining a second fixed-type for quantizing the first variable for calculation of the neural network for the second period after the first period based on the statistical information,
   calculating a quantization error of the first variable between the second fixed-point type and the floating-point type, and
   executing the calculation of the neural network for the second period by using the first variable of the second fixed-point type when the quantization error is less than or equal to the threshold.

10. A non-transitory computer-readable storage medium storing a program that causes a computer to execute a process, the process comprising:
    acquiring statistical information regarding distribution of positions of most significant bits of operation result for calculation of a neural network for a first period, the operation result being obtained by using a first variable that is quantized to a first fixed-point type, the first variable being a variable among variables to be used for the calculation of the neural network,
    generating a threshold value based on reference information related to a first recognition rate obtained by calculation of the neural network when the first variable that is a floating-point type is used and a second recognition rate that is obtained by the calculation of the neural network for the first period,
    determining a second fixed-type for quantizing the first variable for calculation of the neural network for the second period after the first period based on the statistical information,
    calculating a quantization error of the first variable between the second fixed-point type and the floating-point type, and
    executing the calculation of the neural network for the second period by using the first variable of the second fixed-point type when the quantization error is less than or equal to the threshold.

* * * * *